United States Patent Office 3,060,236
Patented Oct. 23, 1962

3,060,236
PROCESS OF PRODUCING ALPHA-BETA UNSATU-
RATED CARBONYL-CONTAINING COMPOUNDS
John Kollar and Johann Gustav David Schulz, Pittsburgh,
Pa., assignors to Gulf Research & Development Com-
pany, Pittsburgh, Pa., a corporation of Delaware
No Drawing. Filed Sept. 25, 1959, Ser. No. 842,205
5 Claims. (Cl. 260—590)

This invention relates to a process for condensing a carbonyl-containing compound with a compound containing at least two active hydrogen atoms on the same carbon atom to obtain an unsaturated compound, particularly an alpha-beta unsaturated carbonyl-containing compound. By "active-hydrogen atoms" we mean those hydrogen atoms attached to carbon atoms adjacent to either electron withdrawing groups or unsaturated groups, either double or triple bonds, which are in conjugation with electron withdrawing groups.

The carbonyl-containing compound which can be employed as one of the reactants in our process can be represented in general by the following structural formula:

$$R_1-\underset{\underset{O}{\|}}{C}-R_2$$

wherein $R_1$ and $R_2$, the same or different, can be, for example, hydrogen; an alkyl group having from one to 20 carbon atoms, such as methyl, ethyl, propyl, isoheptyl, n-hexyl, isohexyl, pentadecyl, eicosanyl, etc.; an aryl group having from 6 to 14 carbon atoms, such as phenyl, naphthyl, anthracyl, etc.; an alkaryl group having from 7 to 30 carbon atoms, such as tolyl, xylyl, α-methylnaphthyl, 1,6-diisooctylanthracyl, etc.; and an aralkyl group having from 7 to 30 carbon atoms derived from such compounds as toluene, α-methyl-naphthalene, 1,4,6,9-tetrabutyl-anthracene, etc. $R_1$ or $R_2$ above can be substituted with halogens, $NO_2$ or $C\equiv N$. Examples of such compounds are acetaldehyde, butyraldehyde, isooctylaldehyde, n-heptaldehyde, isoheptaldehyde, heneicosanaldehyde, benzaldehyde, 2-naphthaaldehyde, 1-anthrylaldehyde, m-tolualdehyde, 4,6-dioctyl-1-anthrylaldehyde, phenylacetaldehyde, α-phenanthrylacetaldehyde, 4-n-heptyl-5-n-octyl-α-anthrylacetaldehyde, chloroacetaldehyde, nitrobenzaldehyde, furfural, o-anisaldehyde and anthranilaldehyde, etc.

The compound containing at least two active hydrogen atoms on the same carbon atom which can be employed as the other reactant in our process can be defined by the following general formula:

$$A-\underset{\underset{H}{|}}{\overset{\overset{H}{|}}{C}}-B$$

wherein A or B, but not both, can be, for example, R as defined above. At least one of A or B must be an electron-withdrawing group such as —CHO; —COR, with R being similar to R as defined above; —$NO_2$; —C≡N;

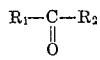

with R being similar to R as defined above;

etc. Examples of such compounds are acetaldehyde, butyraldehyde, isooctylaldehyde, n-heptaldehyde, isoheptaldehyde, 2-pentanone, 2-heptanone, 2-octanone, dipentadecyl ketone, heneicosanaldehyde, phenylacetaldehyde, α-phenanthrylacetaldehyde, 4-n-heptyl - 5 - n - octyl-α-anthrylacetaldehyde, chloroacetaldehyde, cyclohexanone, nitromethane, acetonitrile, malonic acid, diethyl malonate, nitrobutane and n-nonylcyanide, etc.

This reaction encompassed by the process of this invention can be illustrated as follows:

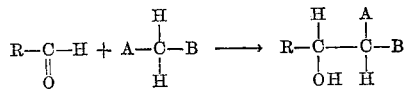

wherein R is as previously defined. Upon further treatment this aldol or aldol-type product will give off water and result in the desired unsaturated compound as follows:

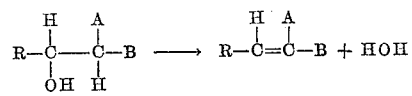

We have found that the condensation reaction defined above can be promoted and excellent conversion with good yields can be obtained with a relatively short reaction time by carrying out the reaction in the presence of a selected amount of an organic salt of magnesium. By an organic salt of magnesium we mean the reaction product of magnesium with an organic or substituted organic acid, a phenol, thiophenol or a substituted phenol or thiophenol or a chelating agent. Examples of organic magnesium salts which can be employed are magnesium heptanoate, magnesium stearate, magnesium isooctanoate, magnesium isoheptanoate, magnesium phenolate, magnesium oleate, magnesium chlorobenzoate, etc. The amount of magnesium catalyst required for the condensation reaction can vary over a wide range, for example, from about 0.001 to about 0.05 mole per mole of total reactants. The magnesium salt can be also employed in larger amounts to advantage without any adverse effects. In general, however, we prefer to employ about 0.005 to about 0.025 mole per mole of total reactant.

The temperature which can be employed can also vary over a wide range to accelerate the condensation reaction, remove the water formed in the reaction (though this is not absolutely necessary) and impart greater solubility to the catalyst in the reaction mixture. Thus, a temperature of about 50° to about 400° C., is satisfactory. Desirably any pressure which will be sufficient to maintain the reactants in liquid phase is sufficient. Therefore, a pressure of about 0 to about 500 pounds per square inch gauge, preferably about 0 to about 100 pounds per square inch gauge can be employed, although atmospheric pressure is preferred.

An unexpected and advantageous feature of the present process resides in the short reaction time required to obtain an excellent conversion with good yields. By reaction time we mean the time during which the reaction mixture is held at reaction temperature. By employing organic salts of magnesium as catalysts in the process, a contact time of about 30 seconds to about 10 hours, preferably about one minute to about 2.5 hours, is sufficient.

Although any method which will bring the reactants and catalyst together under the desired reaction conditions defined above is satisfactory for operation of the process, we prefer, in order to reduce the number of side reactions taking place and promote the desired condensation reaction, to add the aldehyde to the mixture of catalyst and compound containing at least two active hydrogen atoms on the same carbon atom, particularly in cases wherein the aldehyde contains hydrogen alpha to the carbonyl group and no condensation of said aldehyde with itself is desired.

Although it is desired to employ the magnesium salt as such in the reaction mixture, we can form the magnesium salt in the reaction mixture by adding the magnesium metal or magnesium oxide and compound capable of forming a salt therewith separately thereto, for example, an organic acid such as stearic acid.

As noted the initial reaction results in the production of an aldol or an aldol-type compound. As the reaction proceeds the aldol will give off water to produce the desired unsaturated compound. The water need not be removed from the reaction zone during the reaction, although in cases wherein the temperature is high enough and restrictions in the form of equipment are not employed water will volatilize and leave behind the product desired. If the water is not removed during the reaction it can of course be decanted off and further dried by distillation or otherwise if desired.

The invention can further be illustrated by reference to the following examples.

*Example I*

Three moles of isoheptaldehyde were combined with 5.6 grams of magnesium stearate and heated to reflux temperature of 140° C. at atmospheric pressure. During the course of the reaction the temperature was gradually raised to 183° C. since higher molecular weight unsaturated aldehydes were being formed. At the end of one-half hour the conversion of the aldehyde to α-isoamyl-β-isohexyl acrolein was 33.6 mole percent, at the end of one hour 51.9 mole percent, after 1½ hours 61 mole percent and at the end of 2½ hours 71.5 mole percent. Of that converted at the end of the 2½ hour period 93.6 percent by weight was α-isoamyl-β-isohexyl acrolein.

*Example II*

The run of Example I was repeated with the exception that 5.6 grams of magnesium heptanoate was employed as catalyst. Analysis of the reaction product was made at the end of one-half, one, 1½ and 2.5 hours. The conversion was, respectively, 47.6, 64.0, 72 and 77.5 mole percent. 95.59 percent by weight of that converted was α-isoamyl-β-isohexyl acrolein.

*Example III*

Two moles of isooctyaldehyde were combined with 5.6 grams of magnesium isooctanoate to reflux temperature of 156° C. at atmospheric pressure. During the course of the reaction the temperature was gradually increased to 200° C. The conversion of aldehyde was determined at the end of one-half, one and 1½ hours and found to be 51.6, 66.5 and 75.0 mole percent, respectively. The final product was found to contain 98.4 percent by weight of α-isohexyl-β-isoheptyl acrolein.

*Example IV*

Three moles of n-heptaldehyde were combined with 5.6 grams of magnesium stearate and heated to a reflux temperature of 154° C. at atmospheric pressure. During the course of the reaction the temperature was increased to 165° C. The conversion at the end of ½, one, 1½ and 2 hours was found to be 25.5, 42.5, 55.2 and 67.0 mole percent, respectively. The final product was composed mainly of α-n-amyl-β-n-hexyl acrolein.

*Example V*

One mole of benzaldehyde and one mole of 2-octanone were combined with 5.6 grams of magnesium stearate and heated to reflux temperature of 173° C. at atmospheric pressure. During the course of the reaction the temperature was gradually increased to 245° C. At the end of four hours the conversion of the charge mixture to styryl hexyl ketone was 60 mole percent. The remainder was higher-boiling material.

That an organic salt of magnesium is unique as catalyst in our reaction is apparent from Example VI below, wherein extremely low conversions were obtained using magnesium metal as catalyst.

*Example VI*

Two moles of isooctylaldehyde were combined with 5.6 grams of magnesium metal and heated to reflux temperature of 163° C. at atmospheric pressure. During the course of the reaction the temperature was increased to 165° C. The conversion to a mixture containing α-isohexyl-β-isoheptyl acrolein at the end of the 1½, 2½, 3½ and 6½ hours was found to be 0.0, 0.0, 0.5 and 3.3 mole percent of the charge, respectively.

Obviously, many modifications and variations of the invention, as hereinabove set forth, can be made without departing from the spirit and scope thereof, and therefore only such limitations should be imposed as are indicated in the appended claims.

We claim:

1. A process of heating a carbonyl-containing hydrocarbon represented by the formula:

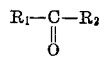

wherein $R_1$ and $R_2$ are selected from the group consisting of:
(a) hydrogen,
(b) an alkyl group having from one to 20 carbon atoms,
(c) an aryl group having from six to 14 carbon atoms,
(d) an alkaryl group having from seven to 30 carbon atoms, and
(e) an aralkyl group having from seven to 30 carbon atoms, with a compound represented by the formula:

wherein at least one of A and B is an electron withdrawing group selected from the group consisting of:
(a) —CHO and
(b) —COR wherein R is selected from the group consisting of $R_1$ and $R_2$ as defined above, and when only one of A and B is one of said electron withdrawing groups then the other is selected from the group consisting of $R_1$ and $R_2$ as defined above, to obtain an alpha-beta unsaturated carbonyl-containing compound wherein the unsaturation is alpha, beta to said electron withdrawing group in the liquid phase at a temperature of about 50° to about 400° C. in the presence of an organic salt of magnesium soluble in the reaction mixture.

2. A process according to claim 1 wherein $R_1$ and $R_2$ in the carbonyl-containing hydrocarbon reactant are an alkyl group having from one to 20 carbons and hydrogen, respectively, and in the compound containing one of said electron withdrawing groups A is an alkyl group having from one to 20 carbon atoms and B is —CHO.

3. A process of heating isoheptaldehyde in the liquid phase at a temperature of about 50° to about 400° C. in the presence of magnesium stearate to obtain a product containing an alpha-beta unsaturated carbonyl-containing compound.

4. A process of heating isooctylaldehyde in the liquid phase at a temperature of about 50° to about 400° C. in the presence of magnesium isooctanoate to obtain a product containing an alpha-beta unsaturated carbonyl-containing compound.

5. A process of heating benzaldehyde with 2-octanone in the liquid phase at a temperature of about 50° to about 400° C. in the presence of magnesium stearate to obtain a product containing an alpha-beta unsaturated carbonyl-containing compound.

References Cited in the file of this patent

UNITED STATES PATENTS

| 2,245,582 | Gallagher et al. | June 17, 1941 |
| 2,545,261 | Cole | Mar. 13, 1951 |
| 2,820,067 | Mertzweiller et al. | Jan. 14, 1958 |

FOREIGN PATENTS

| 478,621 | Canada | Nov. 13, 1951 |

Notice of Adverse Decision in Interference

In Interference No. 95,440 involving Patent No. 3,060,236, J. Kollar and J. G. D. Schulz, PROCESS OF PRODUCING ALPHA-BETA UNSATU- RATED CARBONYL-CONTAINING COMPOUNDS, final judgment adverse to the patentees was rendered Apr. 25, 1968, as to claim 2.
[*Official Gazette October 29, 1968.*]